United States Patent
Lan et al.

(10) Patent No.: US 10,769,803 B2
(45) Date of Patent: Sep. 8, 2020

(54) SIGHT VECTOR DETECTING METHOD AND DEVICE

(71) Applicant: INDUSTRIAL TECHNOLOGY RESEARCH INSTITUTE, Hsinchu (TW)

(72) Inventors: Yu-Ying Lan, Hsinchu (TW); Hsin-Cheng Lin, Changhua (TW); Sen-Yih Chou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 123 days.

(21) Appl. No.: 16/231,724

(22) Filed: Dec. 24, 2018

(65) Prior Publication Data

US 2020/0160545 A1 May 21, 2020

(30) Foreign Application Priority Data

Nov. 16, 2018 (TW) .............................. 107140925 A

(51) Int. Cl.
*G06T 7/50* (2017.01)
*G06F 3/01* (2006.01)
*G06T 7/73* (2017.01)

(52) U.S. Cl.
CPC ................ *G06T 7/50* (2017.01); *G06F 3/013* (2013.01); *G06T 7/75* (2017.01); *G06T 2207/30201* (2013.01)

(58) Field of Classification Search
CPC ... G06T 7/50; G06T 7/75; G06T 2207/30201; G06F 3/013
See application file for complete search history.

(56) References Cited

U.S. PATENT DOCUMENTS

| | | | |
|---|---|---|---|
| 8,107,688 B2 * | 1/2012 | Kozakaya | G06K 9/00221 382/117 |
| 8,888,287 B2 * | 11/2014 | Yahav | G02B 27/01 351/210 |

(Continued)

FOREIGN PATENT DOCUMENTS

| | | |
|---|---|---|
| CN | 102749991 A | 10/2012 |
| CN | 108171218 A | 6/2018 |

(Continued)

OTHER PUBLICATIONS

Gaze Tracking Technology—the Possibilities and Future : Fujitsu Journal, Sep. 9, 2014, pp. 1-9, https://journal.jp.fujitsu.com/en/2014/09/09/01/.

(Continued)

*Primary Examiner* — Utpal D Shah
(74) *Attorney, Agent, or Firm* — Birch, Stewart, Kolasch & Birch, LLP

(57) ABSTRACT

A sight vector detecting method includes: capturing a user image by an image capture unit and a depth capture unit to obtain a first image and a distance information; based on the first image and the distance information, finding an eye center location of the user; predicting a user sight location by a gaze model to find a target sight location of the user on a target; based on the eye center location of the user, finding a first word coordinate of the eye center location of the user; based on the target sight location of the user, finding a second word coordinate of the target sight location of the user; and based on the first word coordinate of the eye center location of the user and the second word coordinate of the target sight location of the user, calculating a sight vector of the user.

16 Claims, 6 Drawing Sheets

(56) References Cited

U.S. PATENT DOCUMENTS

| | | | | |
|---|---|---|---|---|
| 9,329,683 | B2* | 5/2016 | Ebisawa | A61B 3/113 |
| 9,442,561 | B2 | 9/2016 | Itoh | |
| 9,568,422 | B2* | 2/2017 | Yamashita | G01N 21/3581 |
| 9,857,870 | B2* | 1/2018 | Lee | H04N 7/18 |
| 10,671,156 | B2* | 6/2020 | Wu | G06F 3/013 |
| 10,682,038 | B1* | 6/2020 | Zhang | A61B 1/04 |
| 2007/0279590 | A1* | 12/2007 | Ebisawa | A61B 3/113 |
| | | | | 351/208 |
| 2013/0215149 | A1* | 8/2013 | Hayashi | G06T 19/006 |
| | | | | 345/633 |
| 2013/0329957 | A1* | 12/2013 | Ebisawa | A61B 3/113 |
| | | | | 382/103 |
| 2015/0199812 | A1* | 7/2015 | Hakoshima | A61B 3/113 |
| | | | | 348/78 |
| 2015/0296135 | A1* | 10/2015 | Wacquant | G06K 9/00261 |
| | | | | 348/207.11 |
| 2016/0063303 | A1* | 3/2016 | Cheung | G06K 9/00248 |
| | | | | 382/103 |
| 2016/0085301 | A1* | 3/2016 | Lopez | G06F 3/012 |
| | | | | 345/156 |
| 2016/0086338 | A1 | 3/2016 | Nagamatsu et al. | |
| 2016/0282937 | A1 | 9/2016 | Thorn | |
| 2016/0309081 | A1* | 10/2016 | Frahm | G06K 9/00604 |
| 2017/0285736 | A1 | 10/2017 | Young et al. | |
| 2019/0172222 | A1* | 6/2019 | Ebisawa | G06T 7/70 |
| 2020/0019241 | A1* | 1/2020 | Ninomiya | A61B 3/113 |

FOREIGN PATENT DOCUMENTS

| | | |
|---|---|---|
| EP | 2515526 A2 | 10/2012 |
| TW | 201605407 A | 10/2012 |
| TW | 201411413 A | 3/2014 |
| TW | I636381 B | 6/2018 |

OTHER PUBLICATIONS

Taiwanese Office Action and Search Report, dated Dec. 31, 2019, for Taiwanese Application No. 107140925.

* cited by examiner

SIGHT VECTOR DETECTING METHOD AND DEVICE

CROSS-REFERENCE TO RELATED ART

This application claims the benefit of Taiwan application Serial No. 107140925, filed Nov. 16, 2018, the disclosure of which is incorporated by reference herein in its entirety.

TECHNICAL FIELD

The disclosure relates in general to a sight vector detection method and device.

BACKGROUND

Sight vector detection has many possible applications in human daily life, such as exhibition guide, electronic gaming, detection of driver concentration etc. When the user is looking at an object (for example, a computer screen, any transparent material (for example, glass), any non-transparent material, projecting screen), how to detect the user sight vector is one of industry efforts.

Currently, it is developed that the location of user pupils is detected via the image camera and intra-red (IR) camera and thus the sight target of the user on the target object is found. However, in this technology, the user has to stand in front of the center of the target object. That is, if the user does not stand in front of the center of the target object (i.e. if the user stands in front of the right side or the left side of the target object), this technology may not correctly detect the sight target of the user.

Besides, it is also developed to find the sight target of the car driver, the train driver or the steersman by several image cameras and several intra-red cameras, which is more complicated. In detecting the sight target of the user, the IR LEDs emit IR rays to the user eyes. The user retinal may be damaged if the IR LEDs emits too much light on the user retinal.

Thus, how to detect sight vector of the user safe and simple is one of the efforts.

SUMMARY

According to one embodiment, provided is a sight vector detection method including: capturing an image of a user by an image capture element and a depth capture element to obtain a first image and a distance information, respectively; based on the first image and the distance information, finding an eye center location of the user; based on a gaze model, predicting a user sight location to find a target object sight location of the user on a target object; based on the eye center location of the user, calculating a first world coordinates of the eye center of the user; based on the target object sight location of the user, calculating a second world coordinates of the target object sight location of the user; and based on the first world coordinates of the eye center of the user and the second world coordinates of the target object sight location of the user, calculating a sight vector of the user.

According to another embodiment, provided is a sight vector detection device including: an image capture element and a depth capture element for capturing an image of a user to obtain a first image and a distance information, respectively; and a processing circuit, coupled to the image capture element and the depth capture element. The processing circuit is configured for: based on the first image and the distance information, finding an eye center location of the user; based on a gaze model, predicting a user sight location to find a target object sight location of the user on a target object; based on the eye center location of the user, calculating a first world coordinates of the eye center of the user; based on the target object sight location of the user, calculating a second world coordinates of the target object sight location of the user; and based on the first world coordinates of the eye center of the user and the second world coordinates of the target object sight location of the user, calculating a sight vector of the user.

Figure 1:
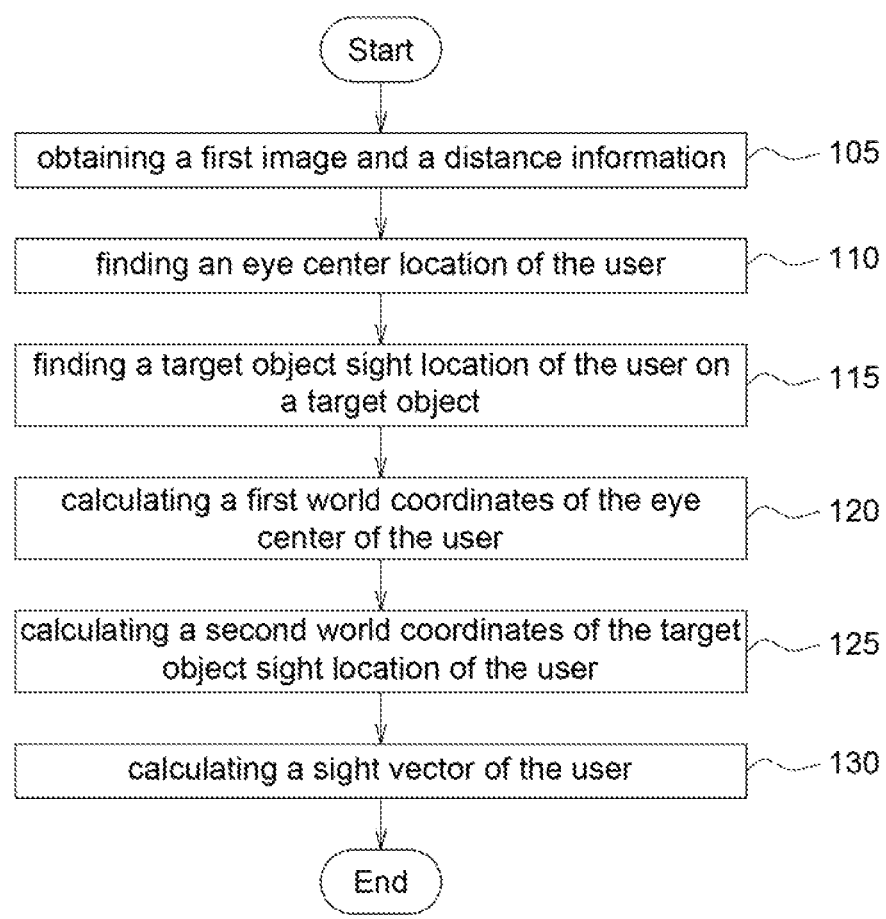
FIG. 1 shows a flow chart for detecting sight vector according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a flow chart for detecting sight vector according to an embodiment of the application. As shown in FIG. 1, in step 105, an image capture element (for example but not limited by, a CCD) and a depth capture element (for example a depth camera which captures depth information or other distance identifier which may capture depth information) to respectively capture a user image to obtain a first image and a distance information.

In step 110, based on the first image and the distance information, an eye center location of the user is found. Further, the distance information is a depth information of the user head image of the first image captured by the depth capture element. That is, the distance information may refer to a distance between the user head and the depth capture element.

In step 115, based on a gaze model, a user sight location is predicted to find a target object sight location of the user (the target object sight location of the user referring to the location of the user sight on the target object).

In step 120, based on the user eye center location, a first world coordinates of the user eye center is calculated.

In step 125, based on the target object sight location of the user, a second world coordinates of the target object sight location of the user is calculated.

In step 130, based on the first world coordinates of the user eye center and the second world coordinates of the target object sight location of the user, a sight vector of the user is calculated.

In step 105, the user image captured by the image capture element and the user image captured by the depth capture element are flipped into the first image. That is, the first image includes two images, one image being obtained by flipping the user image captured by the image capture element and the other image being obtained by flipping the user image captured by the depth capture element. In an embodiment of the application, if the image capture element is not an imaging camera, then image flip is performed. If the image capture element is an imaging camera, then image flip is skipped.

Besides, in an embodiment of the application, the image processing function may be used to detect the user head location in the first image and to find the eye center location of the user.

Besides, the background erase operation may be performed on the first image to erase other while keep the user head image for subsequence image processing. The background erase operation is optional.

In an embodiment of the application, the screen is taken as an example. In fact, the application may be used in other target objects (for example, a computer screen, any transparent material (for example, glass), any non-transparent material, projecting screen) which is still within the scope and the spirit of the application.

In an embodiment of the application, before step 105, resolution calibration may be optionally performed to find the pixel resolution. Details of resolution calibration are as follows.

In an embodiment of the application, the gaze model may store the following information (which is predicted by the gaze model); (1) the user location information in the first image; (2) the user face information in the first image (which includes the size and the rotating angle of the user face); and (3) the user eye information in the first image (including the user eye center coordinates ($x_{eyecenter}$, $y_{eyecenter}$) in the first image, wherein the unit of the user eye center coordinates ($x_{eyecenter}$, $y_{eyecenter}$) is a pixel and the origin is the left right corner).

Figure 2A:
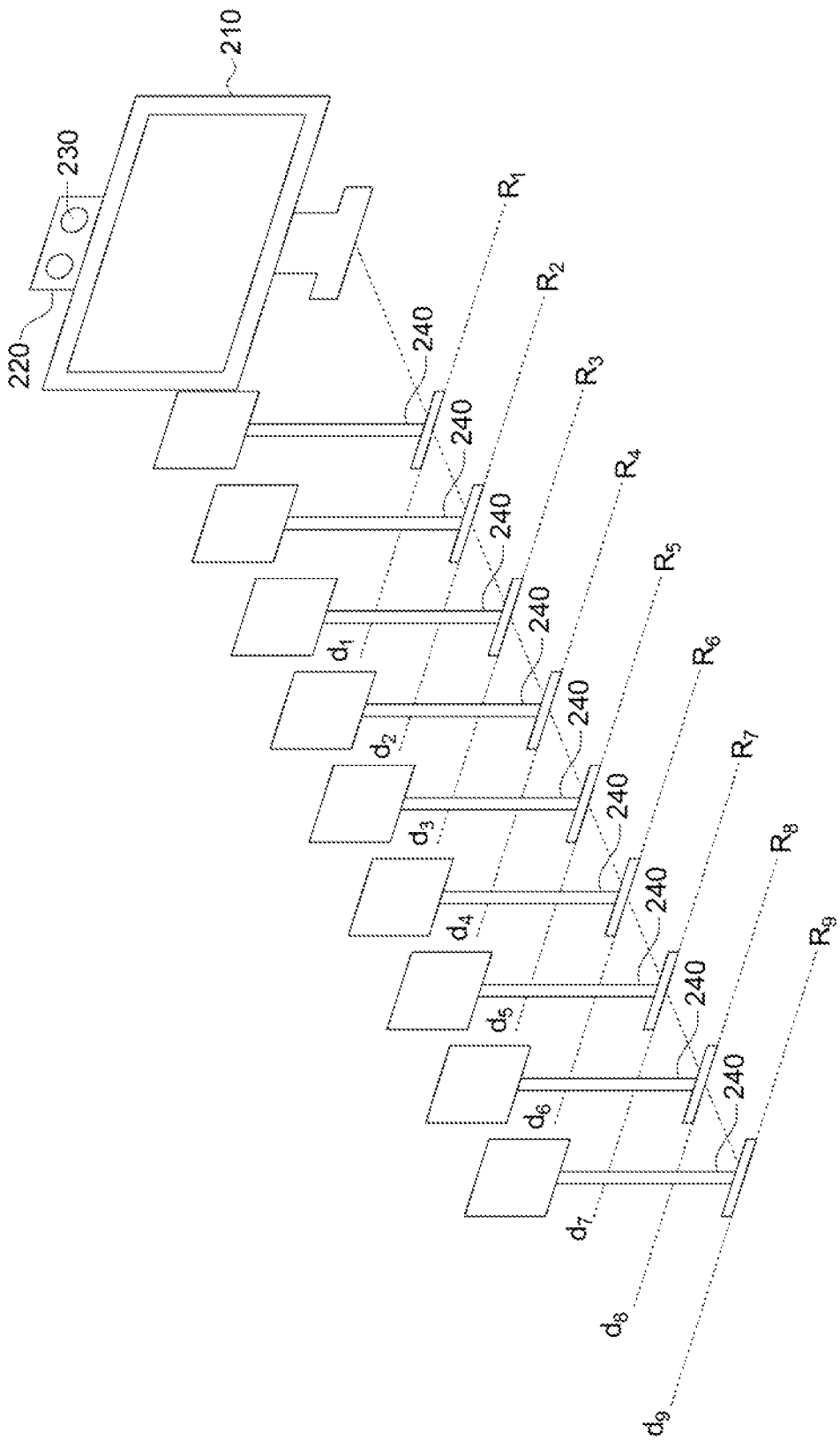
FIGS. 2A-2C show a flow of resolution calibration according to an embodiment of the application.
Figure 2B:
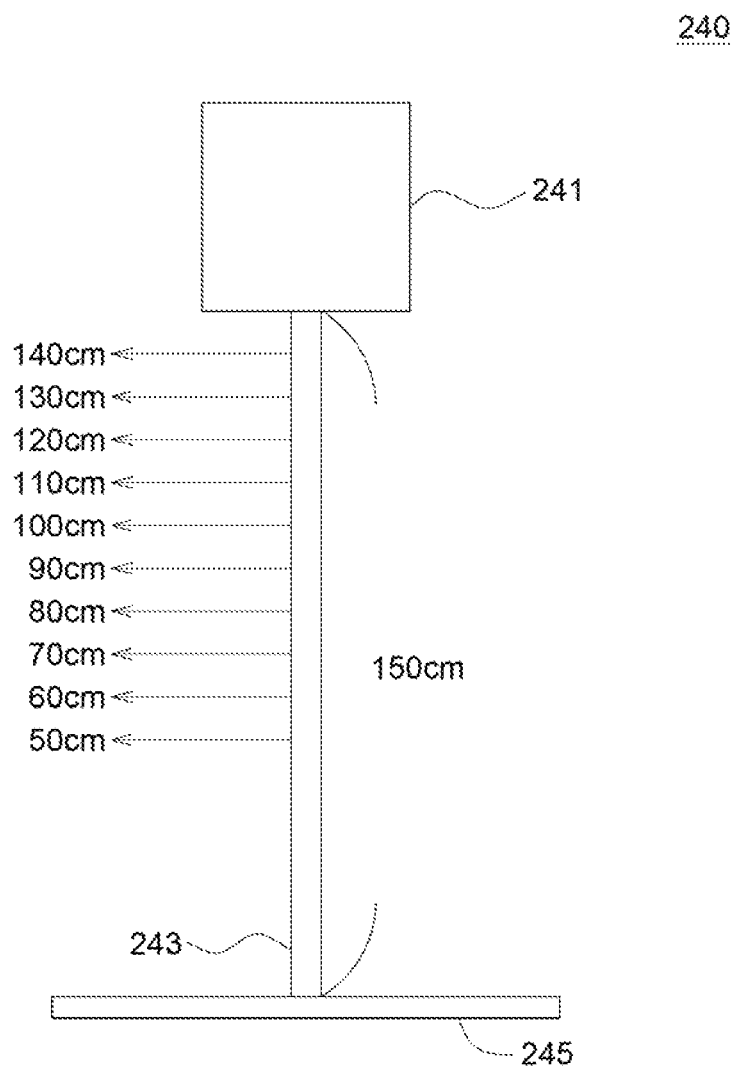
Figure 2C:
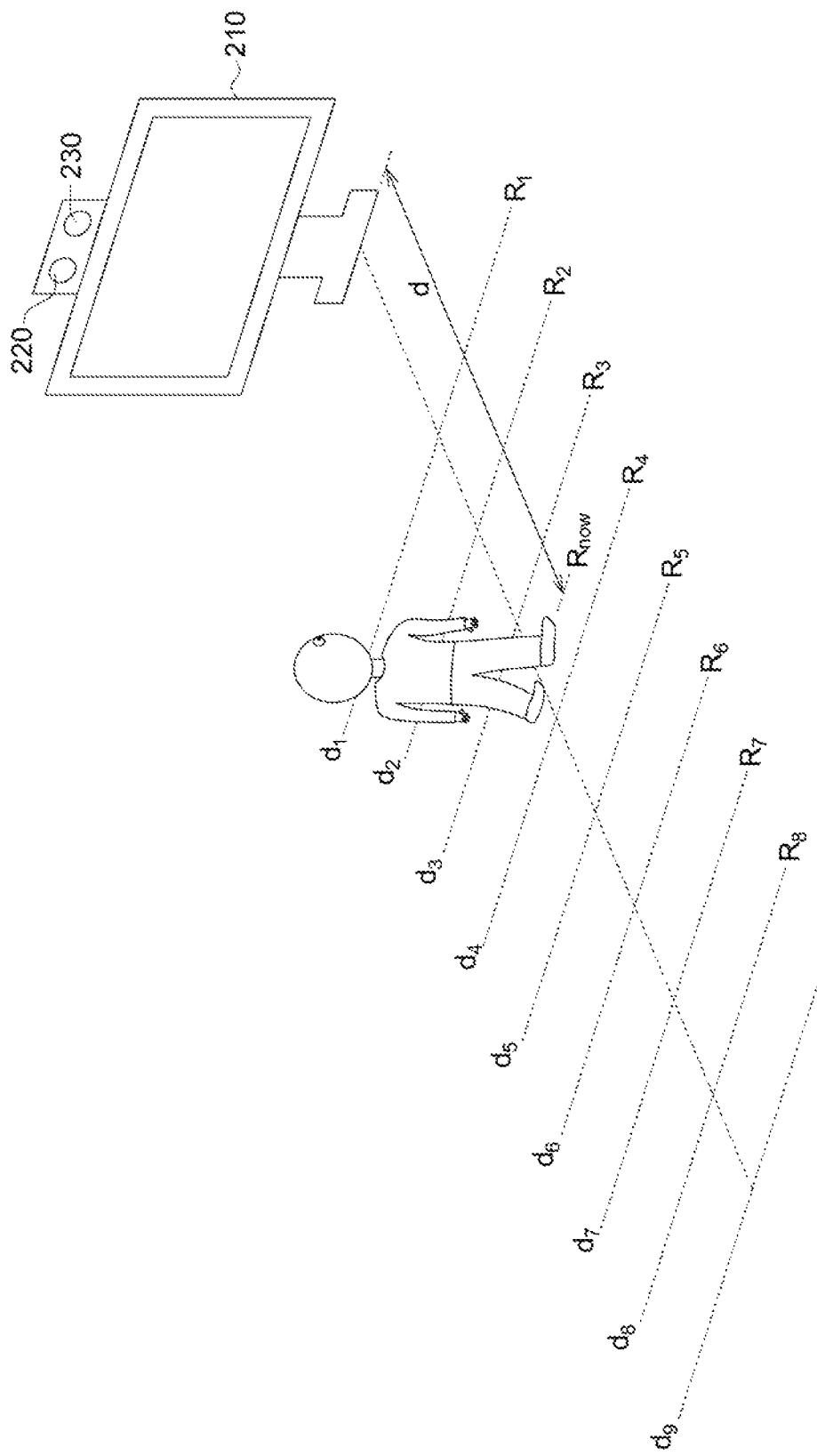

FIGS. 2A-2C show a flow of resolution calibration according to an embodiment of the application. FIG. 2A shows in resolution calibration, the calibration element 240 is placed at respective locations d1-d9 from the image capture element 220 and at each location d1-d9, the image capture element 220 captures the images of the calibration element 240 for calculating pixel resolution at each location d1-d9. The reference symbol 210, 220 and 230 refer to the target object, the image capture element and the depth capture element. In one possible embodiment, the locations d1-d9 are 20 cm, 30 cm, . . . , and 100 cm (each location is spaced 10 cm from each other) from the image capture element 220 but the application is not limited by this. In an embodiment, the calibration element 240 has an area of 30 cm*30 cm but the application is not limited by this.

Now explain details of calculating pixel resolution. When the calibration element 240 is at the location d1, the image capture element 220 captures the image of the calibration element 240. By using image processing, the image of the calibration element 240 occupies x pixels both at the height direction and the length direction; and thus the pixel resolution R1 at the location d1 is: R1=30/x(cm). The pixel resolutions R2-R9 at the locations d2-d9 may be obtained similarly. In other words, at the location d1, the pixel resolution R1 is higher while at the location d9, the pixel resolution R9 is lower. That is, in an embodiment of the application, the pixel resolution refers to the size (having a unit of cm) of the pixel in the real world.

FIG. 2B shows the calibration element 240 used in the resolution calibration in an embodiment of the application. The calibration element 240 includes: a calibration board 241 (for example but not limited by, being a square board having a size of 30 cm*30 cm), a calibration rod 243 and a base 245 for supporting the calibration rod 243. The calibration board 241 is at top of the calibration rod 243. The calibration rod 243 has a height of 150 cm for example but not limited by this, wherein at 50 cm, 60 cm, . . . , 150 cm, each 10 cm has a respective scale (i.e. the scale is at 50 cm, 60 cm 150 cm).

FIG. 2C shows the pixel resolution $R_{now}$ of the first image when the user is standing at the current location during sight vector detection in an embodiment of the application. In details, the current resolution $R_{now}$ may be expressed as:

$$R_{now} = \frac{d - d_{pre}}{10} * (R_{next} - R_{pre}) \quad (1)$$

In equation (1), the user stands between the location $d_{pre}$ and $d_{next}$, wherein "d" refers to the depth parameter (i.e. the distance between the user and the depth capture element), $d_{pre}$ refers to the marked distance just before the user current location (for example, if the user stands at 36 cm, then $d_{per}$=d2=30 cm), $d_{next}$ refers to the marked distance just behind the user current location (for example, if the user stands at 36 cm, then $d_{next}$=d3=40 cm), and $R_{next}$ and $R_{pre}$ referring to the pixel resolution corresponding to the distances $d_{next}$ and $d_{pre}$, respectively.

As shown in FIG. 2C. the actual size (having a unit of $cm^2$) of the user head in the first image is obtained. That is, the actual size (having a unit of $cm^2$) of the user head in the first image is calculated as: $R_{now}$ multiplied by (the pixel number of the user head in the first image).

Figure 3:
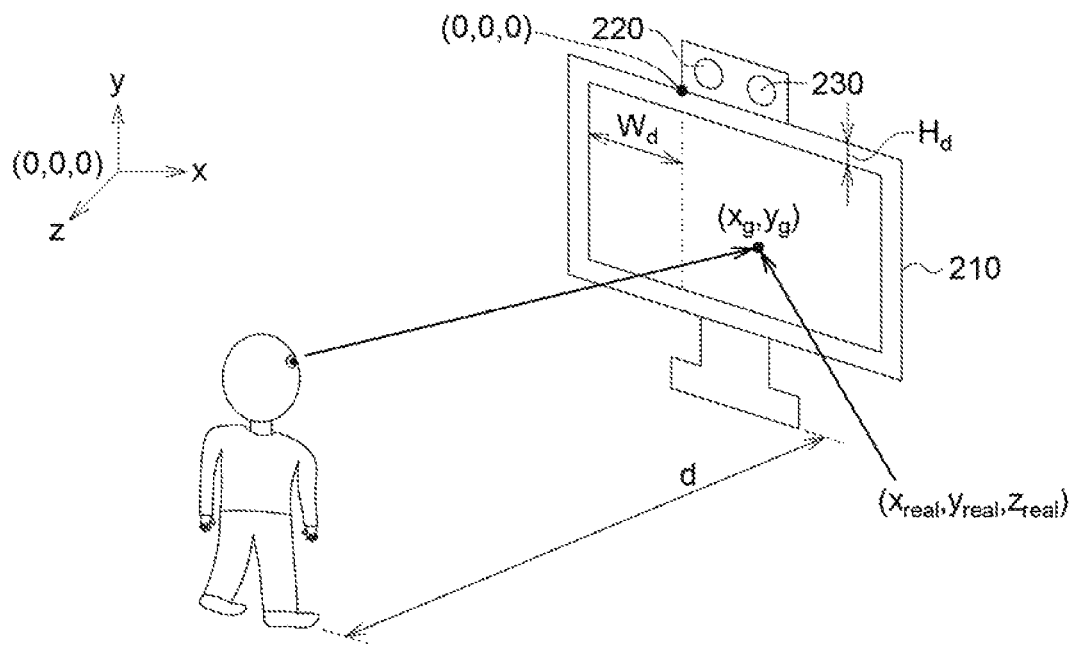
FIG. 3 shows how to find the second world coordinates of the target object sight location of the user in an embodiment of the application.

Details of steps 115 and 125 are as follows. FIG. 3 shows how to find the second world coordinates of the target object sight location of the user in an embodiment of the application. As shown in FIG. 3, the gaze model is used to predict the user sight location on the target object for finding the target object sight location ($x_g$, $y_g$) of the user, wherein the target object sight location ($x_g$, $y_g$) indicates coordinates on the target object having the upper left corner as the origin (0, 0) and the coordinate unit is a pixel.

Based on the target object sight location ($x_g$, $y_g$) of the user, the second world coordinates ($x_{real}$, $y_{real}$, $z_{real}$) of the target object sight location of the user is calculated. That is, the following equations (2-1)-(2-3) are used in calculating the second world coordinates ($x_{real}$, $y_{real}$, $z_{real}$) of the target object sight location of the user. In an embodiment of the application, the world coordinates has the left bottom corner of the image capture element as the origin (0,0,0).

$$x_{real} = x_g * R_{screen\ height\ pixel} - W_d \quad (2\text{-}1)$$

$$y_{real} = 0 - y_g * R_{screen\ width\ pixel} - H_d \quad (2\text{-}2)$$

$z_{real}=0$ (2-3)

wherein $H_d$ referring to the vertical distance (in cm) between the bottom of the image capture element 220 and the upper edge of the target object 210 and $W_d$ referring to the horizontal distance (in cm) between the left right corner of the target object 210 to the left bottom corner of the image capture element 220.

$R_{screen\ height\ pixel}$=(the actual height (in cm) of the target object)/(the pixel number along the height direction of the image). $R_{screen\ width\ pixel}$=(the actual width (in cm) of the target object)/(the pixel number along the width direction of the image). For example, the target object is the computer screen having height of 30 cm and width of 50 cm. The image by the image capture element 220 has resolution of 1920 (width)*1080 (height). Then, $R_{screen\ height\ pixel}$=30 (cm)/1080 $R_{screen\ width\ pixel}$50(cm)/1920.

Figure 4:
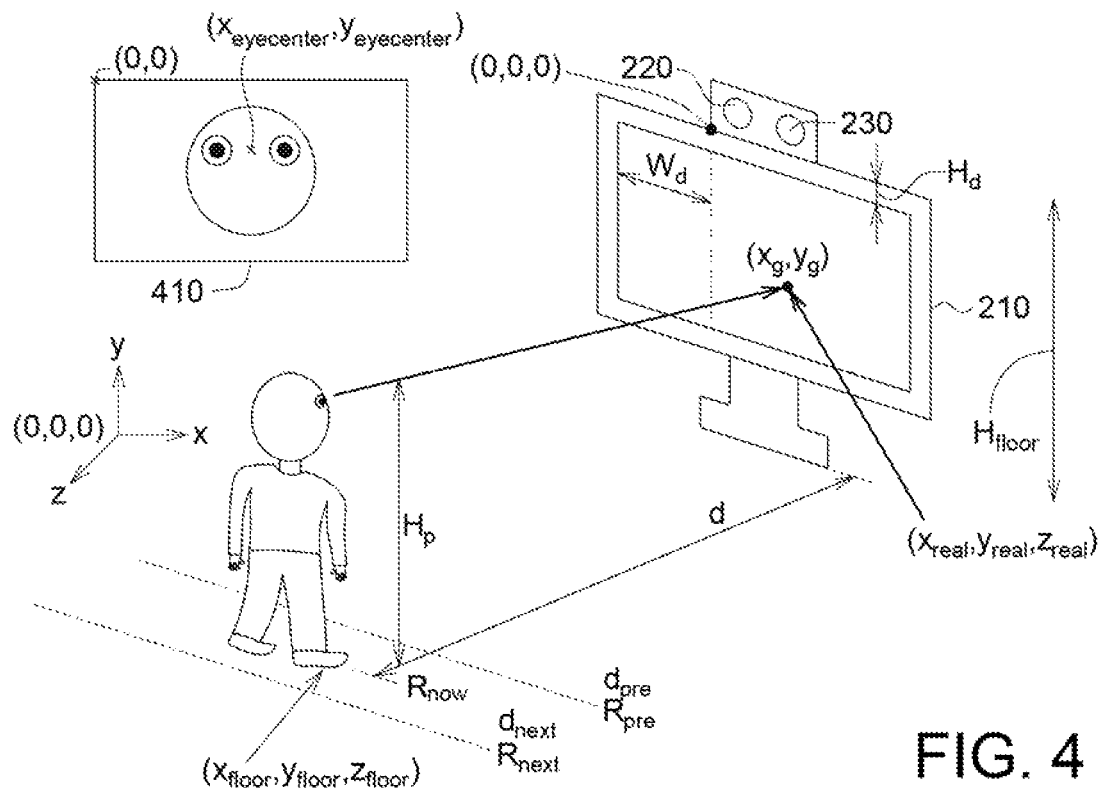
FIG. 4 shows how to find the world coordinates of the user stand location in an embodiment of the application.

FIG. 4 shows how to find the world coordinates of the user stand location in an embodiment of the application.

In an embodiment of the application, the world coordinates ($x_{floor}$, $y_{floor}$, $z_{floor}$) of the user standing location may be expressed as the following equation (3-1)-(3-3):

$$x_{floor}=(\text{img}_{height}-x_{eyecenter})* R_{now} \quad (3\text{-}1)$$

$$y_{floor}=0-H_{floor} \quad (3\text{-}2)$$

$$z_{floor}=d \quad (3\text{-}3)$$

"$\text{img}_{height}$" refers the height (having a unit of pixel number) of the first image. "$x_{eyecenter}$" refers to the x coordinate (having a unit of pixel) of the user eye center coordinates in the first image which is predicted by the gaze model. "$H_{floor}$" refers to the height (in cm) from the upper edge of the target object to the ground, "d" refers to the depth parameter which is from the depth capture element 230. The reference symbol 410 refers to the first image. "($x_{eyecentcer}$, $y_{eyecenter}$)" refers to the user eye center coordinates in the first image.

After the depth capture element obtains the depth parameter d, the depth parameter d is introduced into the equation (1) to obtain $R_{now}$.

Figure 5:
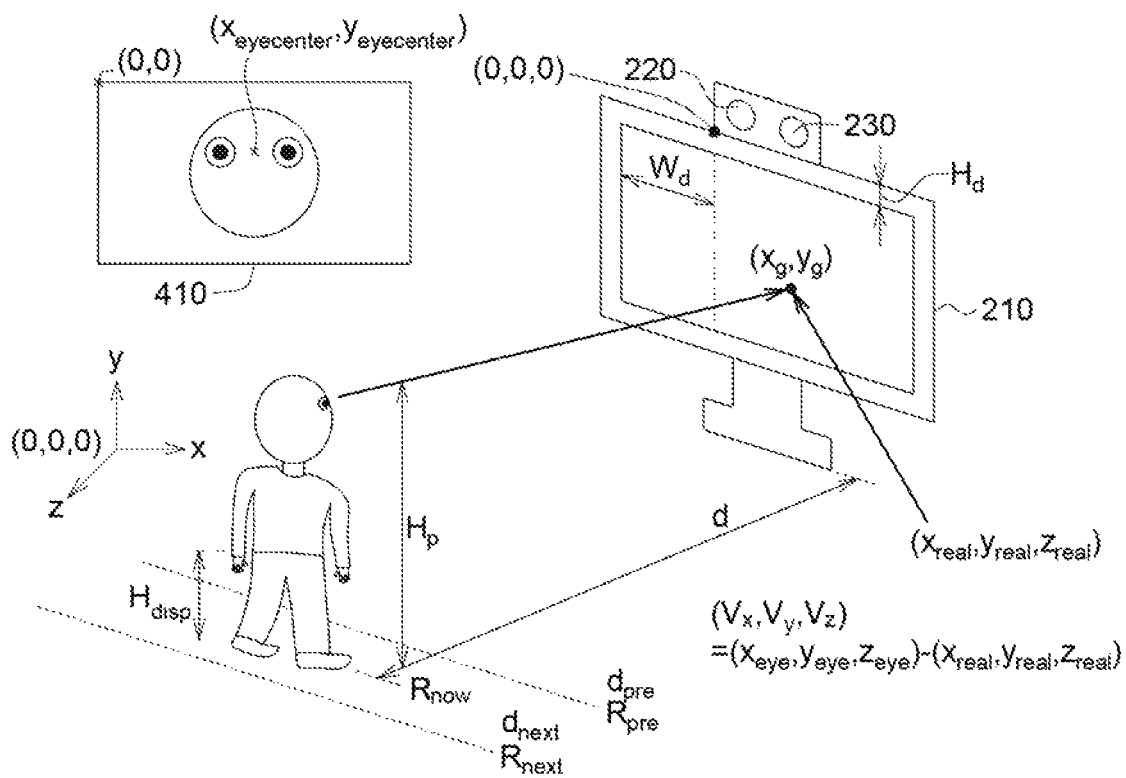
FIG. 5 shows how to find the first world coordinates of the eye center of the user to obtain the sight vector of the user in an embodiment of the application.

FIG. 5 shows how to calculate the first world coordinates of the user eye center to obtain the user sight vector in an embodiment of the application. The world coordinates has the left upper corner of the image capture element as the origin. The first world coordinates of the user eye center are expressed as the following equations (4-1)-(4-3):

$$x_{eye}=x_{floor} \quad (4\text{-}1)$$

$$y_{eye}=H_{floor}-H_p \quad (4\text{-}2)$$

$$z_{eye}=d \quad (4\text{-}3)$$

"$H_p$" refers to the user height (in cm). "$H_p$" may be expressed as following equation (5):

$$H_p = \left(\frac{d - d_{pre}}{10}\right) * (R_{pre} - R_{next}) * y_{eyecenter} + H_{disp} \quad (5)$$

"$H_{disp}$" refers to the disappearance part of the user height, which is not captured by the image captured element. "$H_{disp}$" may be obtained in the resolution calibration. For example, the user has height of 170 cm, but in the first image, the appearance part of the user height, which is captured by the image captured element, is 150 cm. That is. "$H_{disp}$"=20 cm (170-150=20). Further, in resolution calibration, the calibration element 240 has a plurality of scales. When the calibration element 240 is at the location d1, from the captured image, it is obtained that how long is the non-captured part (i.e. the disappearance part) of the calibration element 240 which is not captured by the image capture element. In image capturing, the calibration board 241 has to be totally captured but the lower part of the calibration rod 243 may not be totally captured. From the scales on the calibration rod 243. the length of the non-captured part of the calibration rod 243 which is not captured by the image capture element is obtained. Thus, in resolution calibration, the length of the non-captured part of the calibration rod 243 that is not captured is recorded when the calibration element 240 is at the locations d1-d9, respectively. "$H_{disp}$" may be obtained by lookup table and interpolation.

Thus, the user sight vector ($v_x$, $v_y$, $v_z$) may be obtained by the following equation (6):

$$(v_x, v_y, v_z)=(x_{eye}, y_{eye}, z_{eye})-(\text{i } x_{real}, y_{real}, z_{real}) \quad (6)$$

In an embodiment of the application, when the target object is a non-transparent material (for example but not limited by, a computer screen or a projection screen), the user sight vector ($v_x$, $v_y$, $v_z$) is directed to the non-transparent target object but not passing through the non-transparent target object. For example, if the target object is the computer screen or the projection screen, the user sight vector ($v_x$, $v_y$, $v_z$) calculated in an embodiment of the application is directed to a point on the non-transparent target object, that is. the user is looking at this point on the non-transparent target object.

When the target object is a transparent material (for example but not limited by, a glass), the user sight vector ($v_x$,$v_y$,$v_z$) is directed to the object behind the transparent target object and passes through the transparent target object. For example, if the user is a train driver and the target object is a transparent glass (for example the front windshield of the train), the user sight vector ($v_x$, $v_y$, $v_z$) calculated in an embodiment of the application indicates the user looks at the object outside the train when the user looks from inside to outside.

When there are a plurality of users in front of the target object, the flow in FIG. 1 of the embodiment of the application may be repeated until respective sight vectors of all users are detected (or calculated).

Figure 6:
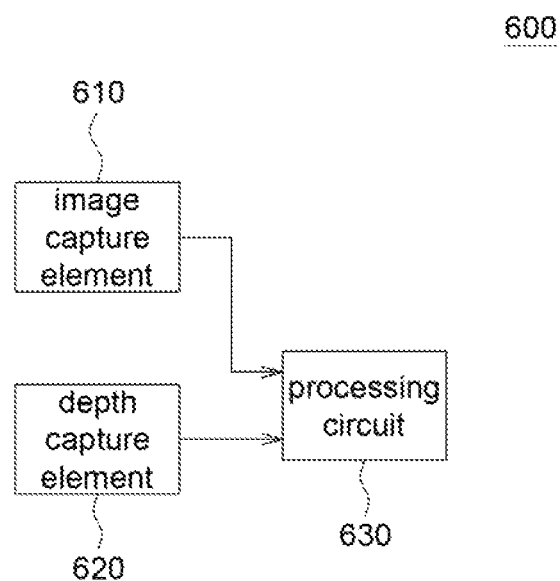
FIG. 6 shows a functional block diagram of the sight vector detection device according to an embodiment of the application.

FIG. 6 shows a functional block diagram of the sight vector detection device according to an embodiment of the application. The sight vector detection device 600 includes: an image capture element 610, a depth capture element 620 and a processing circuit 630. The processing circuit 630 is coupled to the image capture element 610 and the depth capture element 620, Images and information captured by the image capture element 610 and the depth capture element 620 are sent to the processing circuit 630 and the processing circuit 630 executes the sight vector detection method in the above embodiment of the application. Details are not repeated here.

In an embodiment of the application, the user sight vector is found by software implementation. Thus, the embodiment of the application has advantages such as high accuracy, simple calculation and low hardware requirement.

Further, in an embodiment of the application, the user eye center is found by software image processing, i.e. the software image processing is used to identify the user face status for finding the user eye center. Thus, the embodiment of the application does not have to detect the user pupil location which is complicated. Therefore, the embodiment of the application has advantage of simple structure.

Further, in an embodiment of the application, the user image is captured by the image capture element and the depth capture element, wherein the image capture element and the depth capture element has natural light as the light source. Thus, the embodiment of the application does not need to emit IR rays to users and thus accentual hurt on users caused by IR rays may be prevented.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A sight vector detection method comprising:
   capturing an image of a user by an image capture element and a depth capture element to obtain a first image and a distance information, respectively;
   based on the first image and the distance information, finding an eye center location of the user: based on a gaze model, predicting a user sight location to find a target object sight location of the user on a target object;
   based on the eye center location of the user, calculating a first world coordinates of the eye center of the user;
   based on the target object sight location of the user, calculating a second world coordinates of the target object sight location of the user; and
   based on the first world coordinates of the eye center of the user and the second world coordinates of the target object sight location of the user, calculating a sight vector of the user.

2. The sight vector detection method according to claim 1, wherein the distance information is a depth information of a user head image in the first image captured by the depth capture element.

3. The sight vector detection method according to claim 1, wherein the first image includes two images, one of the two images being obtained by flipping the image of the user captured by the image capture element while the other one of the two images being obtained by flipping the image of the user captured by the depth capture element.

4. The sight vector detection method according to claim 1, further comprising performing a background erase operation on the first image.

5. The sight vector detection method according to claim 1, wherein the target object include any transparent material or any non-transparent material.

6. The sight vector detection method according to claim 1, further comprising:
   performing a resolution calibration to calculate a pixel resolution.

7. The sight vector detection method according to claim 1, further comprising:
   based on the eye center location of the user, finding a third world coordinates of a standing location of the user; and
   based on the third world coordinates of the standing location of the user and a user height, calculating the first world coordinates of the eye center of the user.

8. The sight vector detection method according to claim 1, wherein the gaze model stores a user location information in the first image; a user face information in the first image, the user face information including a face size and a face rotation angle; and a user eye information in the first image.

9. A sight vector detection device comprising;
   an image capture element and a depth capture element for capturing an image of a user to obtain a first image and a distance information, respectively, and
   a processing circuit, coupled to the image capture element and the depth capture element, the processing circuit being configured for:
      based on the first image and the distance information, finding an eye center location of the user;
      based on a gaze model, predicting a user sight location to find a target object sight location of the user on a target object;
      based on the eye center location of the user, calculating a first world coordinates of the eye center of the user;
      based on the target object sight location of the user, calculating a second world coordinates of the target object sight location of the user; and
      based on the first world coordinates of the eye center of the user and the second world coordinates of the target object sight location of the user, calculating a sight vector of the user.

10. The sight vector detection device according to claim 9, wherein the distance information is a depth information of a user head image in the first image captured by the depth capture element.

11. The sight vector detection device according to claim 9, wherein the first image includes two images, one of the two images being obtained by flipping the image of the user captured by the image capture element while the other one of the two images being obtained by flipping the image of the user captured by the depth capture element.

12. The sight vector detection device according to claim 9, wherein the processing circuit performs a background erase operation on the first image.

13. The sight vector detection device according to claim 9, wherein the target object include any transparent material or any non-transparent material.

14. The sight vector detection device according to claim 9, wherein the processing circuit further performs a resolution calibration to calculate a pixel resolution.

15. The sight vector detection device according to claim 9, wherein the processing circuit is further configured for.
   based on the eye center location of the user, finding a third world coordinates of a standing location of the user; and
   based on the third world coordinates of the standing location of the user and a user height, calculating the first world coordinates of the eye center of the user.

16. The sight vector detection device according to claim 9, wherein the gaze model stores a user location information in the first image; a user face information in the first image, the user face information including a face size and a face rotation angle; and a user eye information in the first image.

* * * * *